(12) United States Patent
Isaman et al.

(10) Patent No.: US 7,347,320 B2
(45) Date of Patent: Mar. 25, 2008

(54) TOP DRESSER

(75) Inventors: Thomas E. Isaman, Ham Lake, MN (US); David V. Cress, Eagan, MN (US); Steven M. Ferguson, Scandia, MN (US)

(73) Assignee: Turfco Manufacturing, Inc., Minneapolis, MN (US)

( * ) Notice: Subject to any disclaimer, the term of this patent is extended or adjusted under 35 U.S.C. 154(b) by 205 days.

(21) Appl. No.: 10/833,510

(22) Filed: Apr. 28, 2004

(65) Prior Publication Data

US 2005/0242124 A1 Nov. 3, 2005

(51) Int. Cl.
*B65G 23/04* (2006.01)

(52) U.S. Cl. .................. 198/835; 198/813; 198/842

(58) Field of Classification Search ........ 198/833–835, 198/837, 838, 841, 842, 844.1, 845, 846, 198/813, 814

See application file for complete search history.

(56) References Cited

U.S. PATENT DOCUMENTS

| | | | | |
|---|---|---|---|---|
| 3,015,381 | A | * | 1/1962 | Mohwinkel et al. ........ 198/834 |
| 3,021,967 | A | * | 2/1962 | Patzold et al. ............. 198/352 |
| RE25,709 | E | | 1/1965 | Swenson et al. |
| 3,980,174 | A | * | 9/1976 | Conrad ........................ 198/835 |
| 4,253,343 | A | * | 3/1981 | Black et al. ................ 198/814 |
| 5,017,969 | A | * | 5/1991 | Mitomi et al. .............. 198/835 |
| 5,307,952 | A | | 5/1994 | Worrel et al. ........... 239/672 X |
| 5,307,965 | A | | 5/1994 | Worrel ........................ 222/616 |
| 5,320,214 | A | * | 6/1994 | Kordis ........................ 198/837 |
| 5,370,321 | A | | 12/1994 | Bianco |
| 5,478,104 | A | | 12/1995 | Worrel et al. ............... 280/699 |
| 5,501,403 | A | | 3/1996 | van Vooren |
| 5,501,405 | A | | 3/1996 | Doornek |

(Continued)

FOREIGN PATENT DOCUMENTS

EP 0404141 12/1990 ................. 239/665

OTHER PUBLICATIONS

Owner's Manual, TERRATOPPER T-750, TerraCare Products Co., Inc., P.O. Box 250, Pardeeville, WI (undated but prior art to application).

(Continued)

*Primary Examiner*—James R. Bidwell
(74) *Attorney, Agent, or Firm*—Alan Kamrath; Kamrath & Associates PA (57) ABSTRACT

A top dresser (10) includes sheeting (70) in the form of an endless belt passing around first and second drums (148, 160) and a bed (166) including a plurality of rollers (106). Continuous V-shaped guides (122) are received in pulleys (120) on the drums (148, 160) for tracking the endless belt. A blocking device (112) in the form of a rod is slid in the mid-frame (102) to prevent the shafts (108) of the rollers (106) from axially sliding against their bias from their operative positions to their installation positions. Ledges (116) having friction reducing strips (118) extend over the shafts (108) of the rollers (106). A compound gear (180) in gearing relation with the second drum (160) and in driving relation with a spindle (82) of a brush (74) is rotatably mounted to an arm (174) pivotally mounted to the second drum (160). The spindle (82) includes two portions (82*a*, 82*b*) removably connected by a coupler (76), with the first portion (82*a*) being cantilevered supported from the side frame (100).

19 Claims, 5 Drawing Sheets

U.S. PATENT DOCUMENTS

| | | | |
|---|---|---|---|
| 5,533,676 A | 7/1996 | Conley | |
| 5,645,228 A | 7/1997 | Zwart | |
| 5,795,405 A * | 8/1998 | Harnden et al. | 134/25.4 |
| 5,802,994 A | 9/1998 | Kinkead et al. | |
| 5,842,649 A | 12/1998 | Beck et al. | |
| 5,947,391 A | 9/1999 | Beck et al. | |
| 5,950,933 A | 9/1999 | Balmer | 239/655 |
| 5,976,011 A | 11/1999 | Hartman | |
| 5,992,134 A | 11/1999 | Blide et al. | |
| 6,024,033 A | 2/2000 | Kinkead et al. | |
| 6,058,860 A | 5/2000 | Kinkead et al. | |
| 6,149,079 A | 11/2000 | Kinkead et al. | |
| 6,176,367 B1 * | 1/2001 | Patrito | 198/817 |
| 6,186,732 B1 * | 2/2001 | Brown et al. | 414/528 |
| 6,202,944 B1 * | 3/2001 | McCrory | 239/658 |
| 6,220,532 B1 | 4/2001 | Manon et al. | |
| 6,236,008 B1 * | 5/2001 | Bonnet | 209/583 |
| 6,564,932 B2 * | 5/2003 | Itoh | 198/835 |
| RE38,517 E * | 5/2004 | Pfeiffer et al. | 414/276 |
| 6,871,038 B2 * | 3/2005 | Fujiwara | 198/840 |
| 6,935,487 B2 * | 8/2005 | Schaum et al. | 198/812 |
| 7,021,457 B1 * | 4/2006 | Schiltz | 198/835 |
| 2003/0155453 A1 | 8/2003 | Kinkead et al. | 239/673 |
| 2007/0045087 A1 * | 3/2007 | Bude et al. | 198/835 |

OTHER PUBLICATIONS

Photograph of T-1000, TerraCare Products Co., Inc., P.O. Box 250, Pardeeville, WI.

MULTISPREAD™, printed from www.earthandturf.com, date unknown.

Propass 180 Topdresser Unit, Operator's and Part's Manual, © 2002 Copyright Ty-Crop Manufacturing Ltd., Propass 180 Manual, Serial Range #10695 to 10704 (WO#23670), pp. 1-69.

Millcreek Topdresser/Spreader brochure, pp. 1-8, date unknown.

Millcreek Model 4800 High-Capacity Topdresser/Spreader, Millcreek Manufacturing Co. date unknown.

* cited by examiner

TOP DRESSER

BACKGROUND OF THE INVENTION

The present invention generally relates to an apparatus for dispensing or spreading material, particularly to an apparatus for top dressing terrain, and specifically in a most preferred form to top dressers.

Various apparatus exist for applying top dressing to the turf of golf courses, lawns, football, baseball and soccer fields, parks, recreational areas, and the like, for applying calcined clay on baseball diamonds, for sanding icy sidewalks and driveways, and for like applications of a ribbon of material at a preselected rate. An example of one of such apparatus is shown in U.S. Pat. No. 4,438,873 which has been widely and very successfully marketed under the trademark TURFCO METE-R-MATIC and in U.S. Pat. No. 5,307,952 which has been widely and very successfully marketed under various trademarks. With the increasing awareness of the importance of top dressing in turf management, an increasing need exists for improved dispensers to allow the effective, efficient application of material with minimal damage to the turf and with increased ease of operation.

SUMMARY OF THE INVENTION

The present invention solves this need and other problems in the field of apparatus for dispensing or spreading material by providing, in first aspects, pulleys on each of the first and second drums around which an endless belt passes and which receive a continuous guide formed on the engagement surface of the endless belt for tracking the endless belt between the first and second drums.

In further aspects, the present invention provides ledges including friction reducing strips engaging with the engagement surface of an endless belt passing around first and second drums and over a bed including a plurality of rollers, with the ledges extending between the first and second drums and extending over shafts extending beyond the axial ends of the rollers.

The present invention provides, in other aspects, side frames each including inside, top and outside walls integrally formed by folding a sheet of material, with shafts of bed rollers extending through apertures in the inside wall and terminating between the inside and outside walls.

In additional aspects, the present invention provides a blocking device removably secured to the frame having apertures for slideably receiving the shafts of rollers. The shafts are axially slideable within the rollers between operative positions and installation positions, with the blocking device abutting with the axial ends of the shafts to prevent their sliding from their operative positions to their installation positions.

In other aspects, the present invention provides tensioning the endless belt passing around first and second drums utilizing a slide slideably mounted on a rail and biased by a spring located around a screw secured to a lug provided on the rail and received in a bushing received in the slide and sandwiched between the slide and a nut received on the screw.

In still further aspects, the present invention provides an arm pivotally mounted to the second drum around which an endless belt passes, with a compound gear rotatably mounted to the arm about an axis parallel to and spaced from the second drum and in gearing relation with a first gear rotatable with the second drum and in driving relation with a spindle parallel to and spaced from the second drum.

In another aspect, the present invention provides tensioning a chain utilizing a slide including an idler sprocket engaging the chain and having an axle extending through an elongated slot parallel to and spaced from a threaded rod extending through the elongated slot, with the slide biased relative to the upright.

The present invention, in still other aspects, provides cantilever support of a drive shaft by its receipt in bearings mounted in collars held in a spaced relation by braces, with a sprocket located between the collars, and with the drive shaft being removably axially coupled with a driven shaft.

Surprisingly, all of the above objectives can be satisfied in the field of material dispensing by illustrative embodiments of top dressers according to the preferred teachings of the present invention, detailed descriptions of which are described in connection with the drawings.

Figure 1:
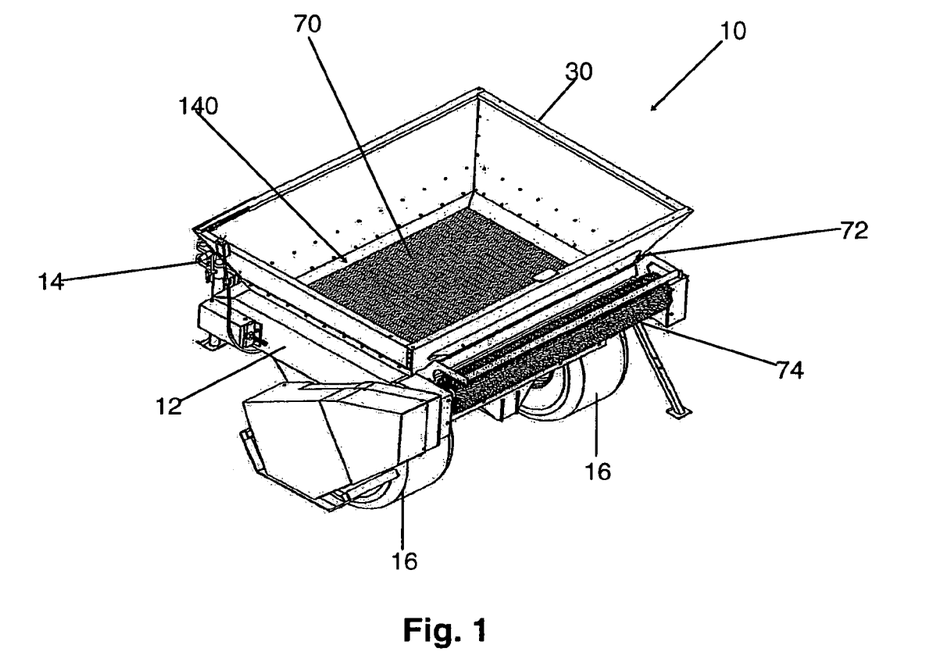
FIG. 1 shows a perspective view of a top dresser according to the preferred teachings of the present invention.
Figure 2:
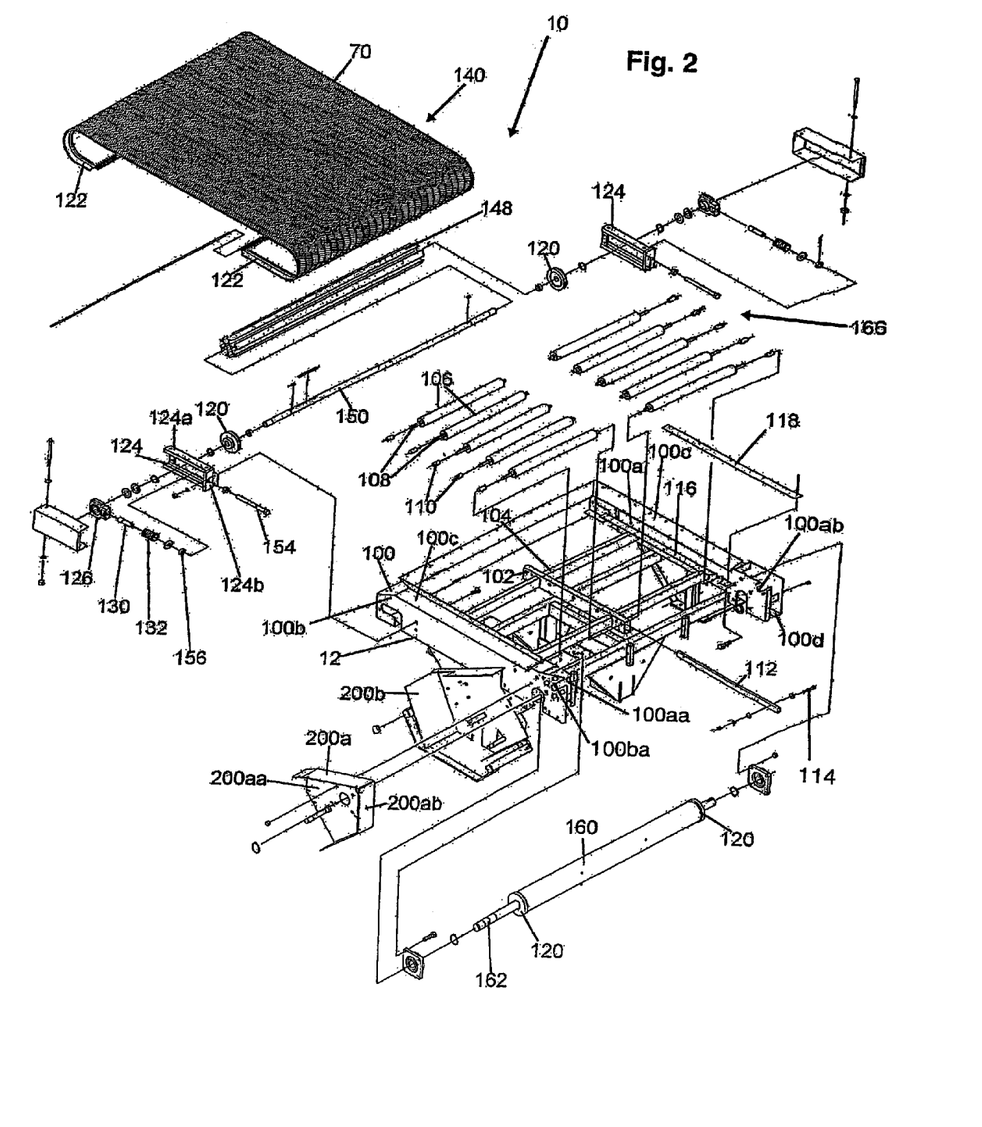
FIG. 2 shows a partial, exploded perspective view of the top dresser of FIG. 1.
Figure 3:
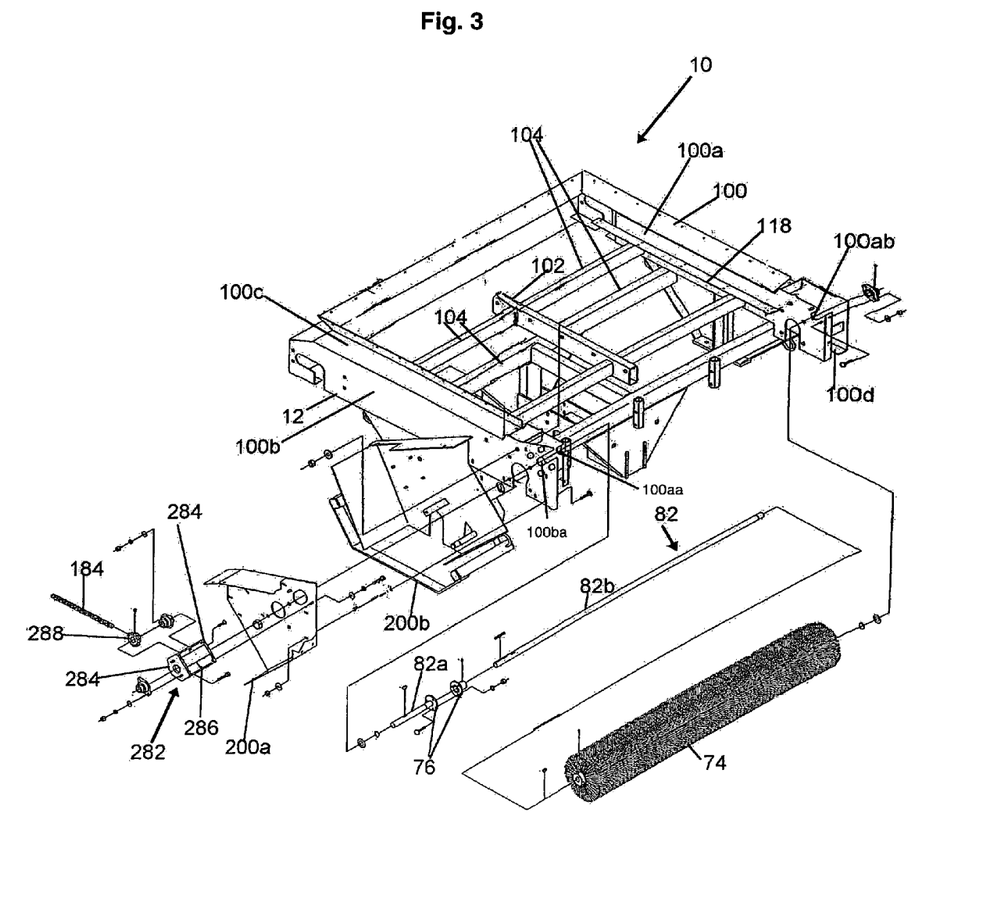
FIG. 3 shows a partial, exploded perspective view of the top dresser of FIG. 1.
Figure 4:
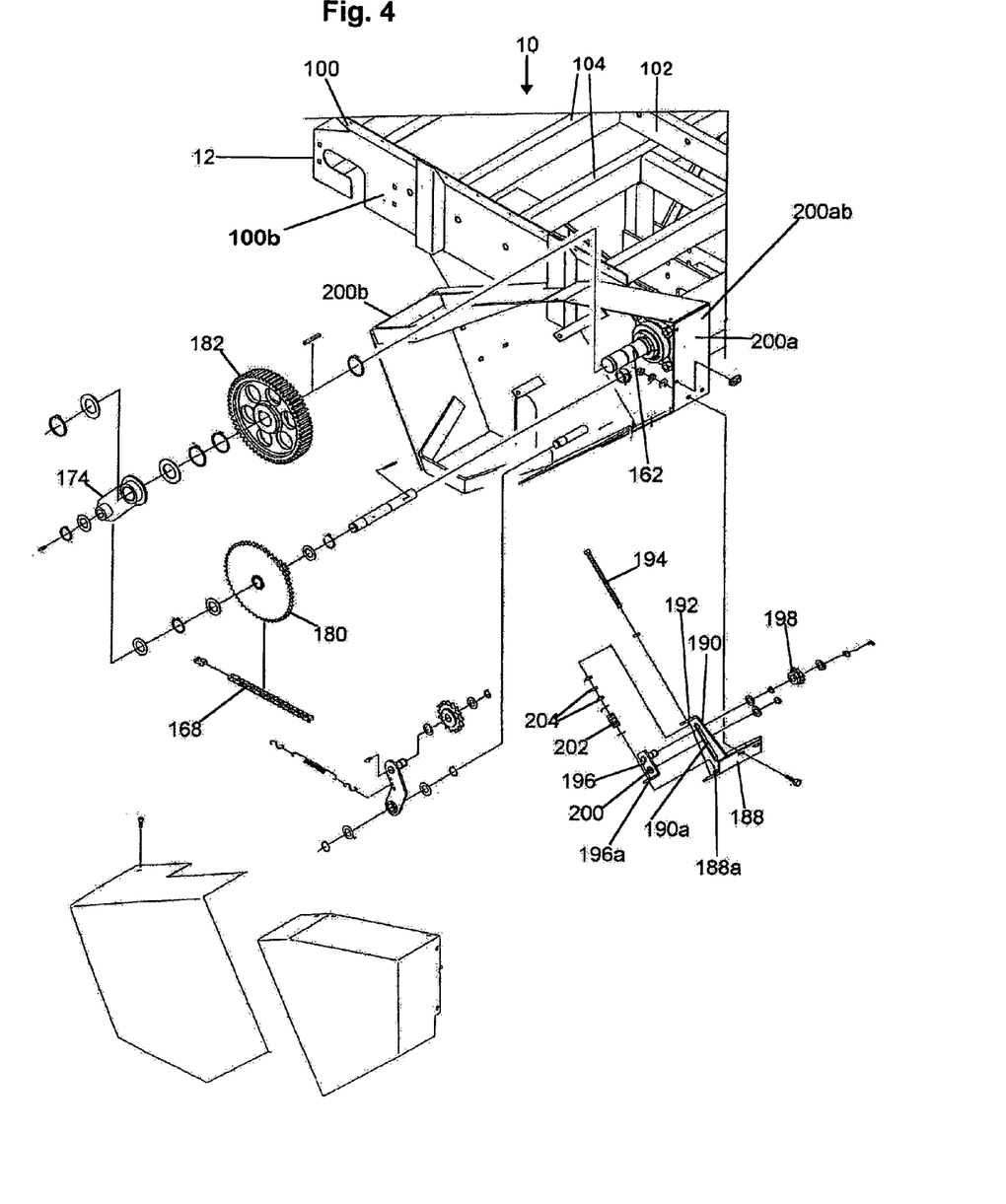
FIG. 4 shows a partial, exploded perspective view of the top dresser of FIG. 1.
Figure 5:
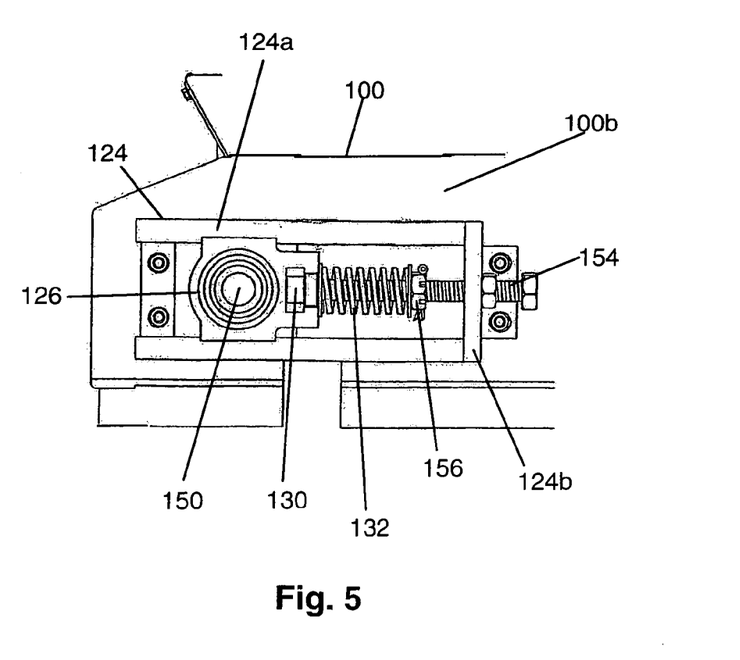
FIG. 5 shows a partial, cross-sectional view of the top dresser of FIG. 1.
Figure 6:
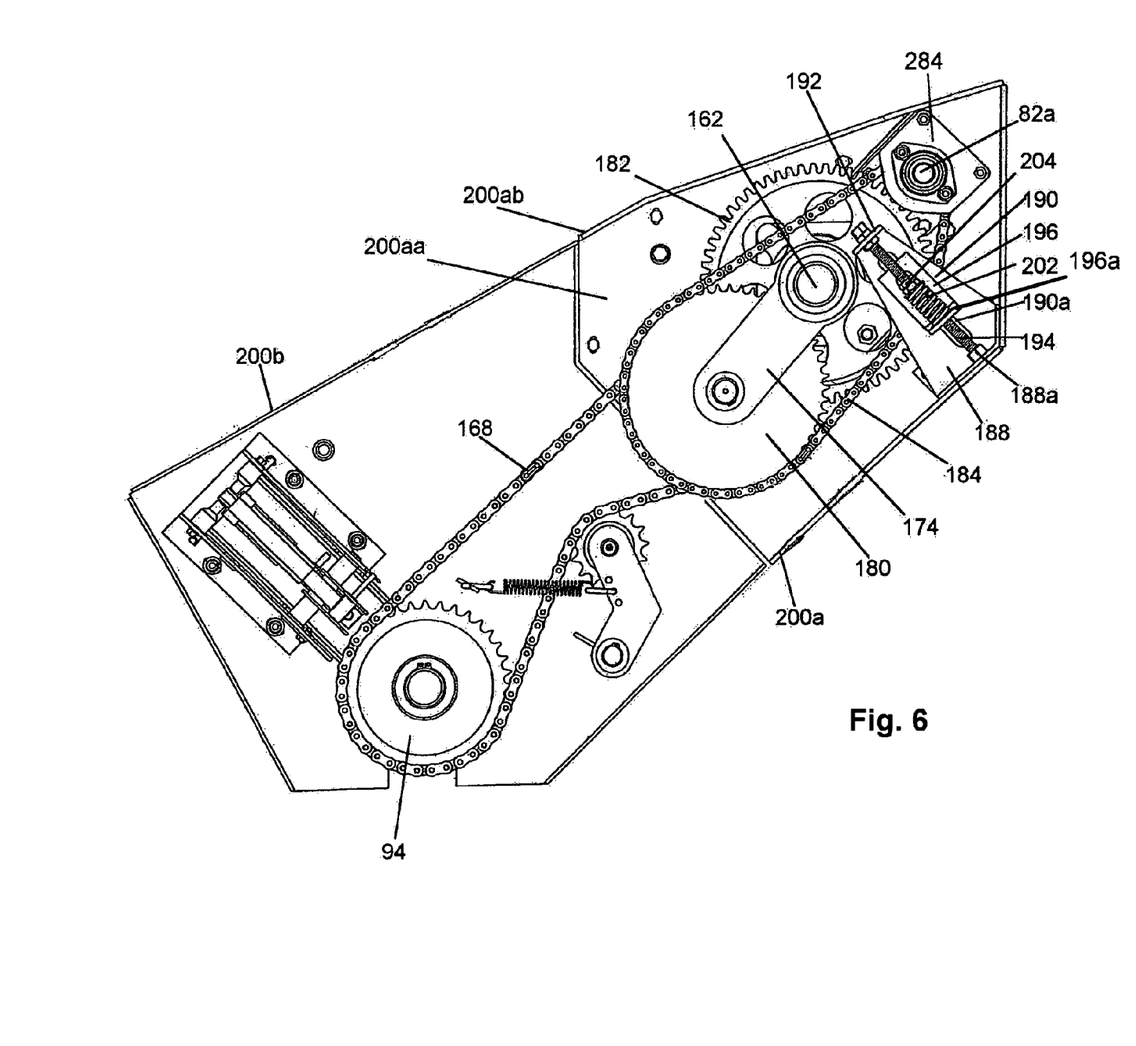
FIG. 6 shows a partial, cross-sectional view of the top dresser of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "end", "side", "above", "longitudinal", and similar terms are used herein, it should be understood that these terms have reference only to the structure shown in the drawings as it would appear to a person viewing the drawings and are utilized only to facilitate describing the invention.

DESCRIPTION OF THE INVENTION

A top dresser according to the preferred teachings of the present invention is shown in the drawings and generally designated 10. Top dresser 10 comprises a frame 12 having a drawbar 14 which top dresser 10 can be coupled to a towing tractor or utility vehicle for pulling thereby in a direction. In the preferred form, frame 12 is movably supported upon the ground by a pair of high floatation wheels 16. A hopper 30 is mounted on frame 12 and generally includes an open top, an open bottom, first and second, parallel closed sides and a front.

In the most preferred form, top dresser 10 is of the endless conveyor-type shown in U.S. Pat. No. 4,438,873, which is hereby incorporated herein by reference. Specifically, a conveyor 140 is disposed so that sheeting 70 in the form of an endless belt passes beneath the hopper 30, more specifically under its open bottom, so as to have gravitationally discharged thereon whatever material is contained in hopper 30 that is to be used in dressing the turf. Sheeting 70 in the form of an endless belt passes over a first, generally cylindrical drum or roller 148 rotatably mounted on a transverse shaft 150 which is adjustable in a fore and aft direction by utilization of threaded rods 154, each of which has a nut 156 thereon. Conveyor 140 further includes a second, generally cylindrical drum or roller 160 mounted for rotation on a transverse shaft 162, with roller 160 being parallel to and horizontally spaced from roller 148. Roller 160 is rotated by any suitable means such as ground driven in the manner shown in U.S. Pat. No. 4,438,873. Sheeting 70 passes over a platen or bed 166 that is supported by frame 12 of top dresser 10 and extending between the rollers 148 and 160. Thus, sheeting 70 in the form of an endless belt passes around rollers 148 and 160 and over the bed 166, with the endless belt having an operative surface adapted to transport material and an engagement surface engaging with rollers 148 and 160 and with bed 166.

Conveyor 140 dispenses material from hopper 30 onto the ground through the end of hopper 30, with sheeting 70 being movable relative to the end of hopper 30. Top dresser 10 further includes metering gate 72 movably mounted at the end of hopper 30 and movable relative to conveyor 140 to meter the amount of material being dispensed. Specifically, gate 72 is movable away from conveyor 140 by any suitable means to create a larger gap for material to pass therethrough such as by pivotally moving gate 72 manually or by hydraulic actuators.

Cylindrical brush 74 located on a spindle or shaft 82 is movably and rotatably mounted above and parallel to conveyor 140 and rollers 148 and 160 thereof. Brush 74 is on the side of gate 72 opposite hopper 30 and in the same direction from gate 72 as the movement of sheeting 70 above bed 166. Brush 74 is rotated in an opposite direction as roller 160 to propel material from sheeting 70 of conveyor 140 onto the ground being dressed with a force sufficient to penetrate to the base of the turf.

In the preferred form, frame 12 includes first and second side frames 100 extending in a spaced parallel relation perpendicular to rollers 148 and 160 and parallel to the movement direction of sheeting 70 above bed 166. In the most preferred form, side frames 100 are double walled and include an inside wall 100a and an outside wall 100b extending parallel to the movement direction of sheeting 70 and extending vertically or perpendicular to the ground. Each side frame 100 further includes a top wall 100c integrally extending between the upper edges of walls 100a and 100b, horizontally, and parallel to the ground. Side frames 100 also can include a bottom wall 100d integrally extending between the lower edges of walls 100a and 100b, horizontally and parallel to the ground and to the top wall 100c. It should be appreciated that bottom wall 100d can be partially or completely removed to allow access between walls 100a and 100b. The inside, outside, top and bottom walls 100a, 100b, 100c, and 100d are integrally formed by bending or folding a sheet of material (metal).

Frame 12 further includes a tubular mid-frame 102 extending parallel to and spaced intermediate side frames 100. Cross braces 104 extend between side frames 100 and mid-frame 102. Bed 166 in the most preferred form is formed of a plurality of rollers 106 supported between side frames 100 and mid-frame 102 and intermediate and parallel to rollers 148 and 160. In particular, rollers 106 are of conventional design and include a shaft 108 having axial ends extending beyond the axial ends of the roller 106 and which define the axis of rotation of rollers 106. Each shaft 108 is axially slideable within roller 106. Shaft 108 is biased from an installation position towards an operative position. In particular, the first, inner axial end of shaft 108 is axially spaced from the roller 106 greater in the installation position than in the operative position. Similarly, the second, outer end of shaft 108 is axially spaced from the roller 106 less in the installation position than in the operative position. During installation, the first, inner end of shaft 108 is placed in an aperture formed in mid-frame 102. Shaft 108 is moved inside roller 106 against its bias from the operative position to its installation position such that the first inner end extends further into mid-frame 102. The second, outer end of shaft 108 is retracted toward the roller 106 such that the roller 106 is thereby allowed to be placed inside the wall 100a. At that time, shaft 108 is released such that it axially moves inside roller 106 from its installation position to its operative position due to its bias until the second, outer axial end of the shaft 108 is received in an aperture formed in wall 100a. In the most preferred form, tubular spacers 110 can be received on shaft 108 intermediate roller 106 and wall 100a. All of the rollers 106 which comprise bed 166 are installed in that manner.

After all rollers 106 are installed, all of shafts 108 will be biased to their operative positions to extend through wall 100a. At that time, a blocking device 112 is removably secured to mid-frame 102 for simultaneously abutting with the first axial ends of shafts 108 received in the apertures of mid-frame 102 and in their operative position for preventing shafts 108 from sliding within rollers 106 to their installation positions. In the preferred form shown, the blocking device 112 is in the form of a hollow tube or rod which is removably secured by sliding in mid-frame 102 between the first, inner axial ends of shafts 108 on opposite sides of mid-frame 102. It can then be appreciated that the blocking device 112 will then prevent the inner ends of shafts 108 from being moved to extend further into mid-frame 102 such that the second outer ends of shaft 108 can not be retracted towards the roller 106 a sufficient distance to allow removal of shafts 108 from the apertures of the wall 100a. Thereby, the rollers 106 are held from removal from the frame 12. Thus, separate locking of each of the rollers 106 as conventionally performed is not required, significantly reducing complexity, labor and time. In the preferred form, suitable provisions such as a bolt 114 extending through blocking device 112 and mid-frame 102 can be provided to prevent undesired removal of the blocking device 112 from mid-frame 102. The second, outer ends of shafts 108 of rollers 106 extending through walls 100a terminate inside of side frames 100 and between the inside and outside walls 100a and 100b.

In the most preferred form, bed 166 further includes a ledge 116 extending across cross braces 104 from wall 100a generally at a height from the rotational axis of shafts 108 generally equal to but slightly less than the upper radial extent of rollers 106. A friction reducing strip 118 is provided on ledge 116 and has a height generally equal to the upper radial extent of rollers 106. It should then be realized that ledge 116 and strip 118 are located axially between rollers 106 and wall 100a.

Each of rollers 148 and 160 includes an idler pulley 120 at their opposite axial ends. Sheeting 70 includes first and second continuous V-shaped guides 122 located on the engagement surface adjacent to its edges for receipt within pulleys 120. Guides 122 are in a spaced, parallel relation. It can be appreciated that guides 122 and pulleys 120 help to keep sheeting 70 tracking between rollers 148 and 160. It should be appreciated that strips 118 and ledges 116 support the edges of sheeting 70 and reduce frictional interaction between guides 122 and frame 12.

In the preferred form, shaft 150 is adjustable in a fore and aft direction by tension adjusters located on opposite axial ends of shaft 150 and inside side frames 100. In particular, each tension adjuster includes a mount 124 having first and second, spaced parallel rails 124*a* extending in a plane perpendicular to shaft 150 and on opposite sides of the shaft 150, with a lug 124*b* extending between the rails 124*a*. The mount 124 is suitably secured to inside wall 100*b* such as by bolts inside of frames 100 and intermediate inside and outside walls 100*a* and 100*b*. A slide 126 is slideably received between rails 124*a* and carries a suitable bearing receiving the shaft 150. A T-shaped slot is formed in slide 126. The threaded rod 154 is threaded in lug 124*b* and is rotatably received in a bushing 130 in turn received in the T-shaped slot of the slide 126. A spring 132 is located concentrically around threaded rod 154 and is sandwiched between nut 156 and slide 126. Thus, by threading nut 156 on threaded rod 154 and/or by threading threaded rod 154 into or out of lug 124*b*, the compression of spring 132 and thus of the tension of sheeting 70 between rollers 148 and 160 can be adjusted.

Top dresser 10 according to the preferred teachings of the present invention includes an improved manner of mounting and driving the brush 74. In particular, shaft 162 includes gear 182, with an arm 174 pivotally mounted on shaft 162. Arm 174 includes a compound gear 180 rotatable about an axis parallel to and spaced from shaft 162. Compound gear 180 is in gearing relation with gear 182 and also receives a chain 168 extending from sprocket 94 of the shaft including the wheels 16. Sprocket 94 can include a suitable clutch mechanism such as disclosed in U.S. Pat. Nos. 4,438,873 or 5,307,965 or the like for selectively rotating sprocket 94. Thus, gear 180 is rotated whenever sprocket 94 rotates, with rotation of sprocket 94 resulting in rotation of gear 182 and shaft 162. Gear 180 also receives a chain 184 extending from gear 288 of the shaft 82 of brush 74. Thus, gear 180 is in driving relation with shaft 82 by chain 184.

To allow removal of brush 74 for replacement by the same or different type, for servicing, or for securement of a different accessory, shaft 82 for the brush 74 includes two shaft portions 82*a* and 82*b* having a coupler 76 therebetween and adjacent gear 288. Shaft portion 82*a* is slideably received in a suitable bearing in side frame 100. Coupler 76 can be of any conventional design which allows shaft portion 82*a* to remain attached to gear 288 and the side frame 100 while shaft portion 82*b* (with brush 74) can be removed. As an example, coupler 76 could be mushroom shaped heads on the adjacent ends of the shaft portions 82*a* and 82*b* which can be removably secured to each other such as by bolts.

Suitable provisions are provided to mount shaft portion 82*a* in a cantilever manner. In particular, a casing 200*a* is provided including a flat panel 200*aa* which can be suitably secured to outside wall 100*b*. A perimeter flange 200*ab* extends generally perpendicular from the outer edge of flat panel 200*aa*. A shaft carrier 282 includes first and second collars 284 held in a spaced parallel relation by braces 286. Each of the collars 284 mounts a bearing for receiving shaft portion 82*a*, with a gear 288 in driving relation with chain 184. One of the collars 284 is secured to flat panel 200*aa* such as by bolts, and flat panel 200*aa* is in turn suitably secured to outside wall 100*b* such as by bolts. In the most preferred form, a U-shaped slot 100*aa* is formed in outside wall 100*b* to which panel 200*aa* is secured for allowing insertion of shaft portion 82*a* in a radial direction. Similarly, a U-shaped slot 100*ba* is formed in inside wall 100*a* to allow insertion of shaft portion 82*b* in a radial direction. In the most preferred form, the inside wall 100*a* of the side frame 100 to which carrier 282 is not mounted includes a U-shaped slot 100*ab* for receipt of a bearing for receiving the opposite axial end of shaft portion 82*b*.

For tensioning chain 184, a tensioning assembly is provided in the preferred form including a holder including a base 188 of a generally V-shape to fit and abut with a corner in the perimeter flange 200*ab* of the casing 200*a*. An upright 190 extends from base 188 spaced intermediate its ends and generally parallel to panel 200*aa*. An elongated slot 190*a* is provided in upright 190. A lip 192 extends generally perpendicularly from the upper end of upright 190 and generally perpendicular to flat panel 200*aa*. A threaded rod 194 extends through lip 192 and has an end threadably received in a nut 188*a* located on the base 188. A slide 196 is slideably mounted relative to upright 190 and mounts an idler sprocket 198 which engages chain 184. In the preferred form, slide 196 is located on the opposite side of upright 190 than sprocket 198 with the shaft of sprocket 198 extending through elongated slot 190*a* parallel to a bolt 200 also extending through elongated slot 190*a* for slideably mounting slide 196 to upright 190. Slide 196 and thus sprocket 198 carried thereby are biased toward base 188 such as by a spring 202 located around threaded rod 194 and sandwiched between a lip 196*a* and nuts 204 threadably received on threaded rod 194, with the lip 196*a* integrally extending from slide 196 generally perpendicular to upright 190 and threaded rod 194.

Casing 200*b* is suitably secured to outside wall 100*b* for receiving sprocket 94. Casings 200*a* and 200*b* together with a cooperating cover(s) enclose the drive mechanism of the top dresser 10 according to the preferred teachings of the present invention.

Side frames 100 of the double wall type allow the wheel base of top dresser 10 to be increased according to the teachings of the present invention. Specifically, with a ground drive, the width of conveyor 140 is limited by the amount of traction between wheels 16 and the turf. However, placing wheels 16 within the width of conveyor 140 may decrease the stability of top dresser 10. Thus, according to the preferred teachings of the present invention, wheels 16 can be positioned within outside walls 100*b* and wider than the conveyor 140 for increased stability according to the preferred form of the present invention.

Now that the basic teachings of the present invention have been explained, many extensions and variations will be obvious to one having ordinary skill in the art. For example, although top dresser 10 of the most preferred form includes the combination of several, unique features believed to obtain synergistic results, apparatus for dispensing material could be constructed according to the teachings of the present invention including such features singly or in other combinations.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Conveyor comprising, in combination: a first drum; a second drum parallel to and spaced from the first drum; a bed extending between the first and second drums; an endless belt passing around the first and second drums and over the bed, with the endless belt including an operative surface adapted to transport material and an engagement surface engaging with the first and second drums and the bed; a first continuous guide formed on the engagement surface of the endless belt; a first pulley on each of the first and second drums receiving the first continuous guide of the endless belt for tracking the endless belt between the first and second drums; a second continuous guide formed on the engagement surface of the endless belt in a spaced, parallel relation to the first continuous guide; and a second pulley on each of the first and second drums receiving the second continuous guide of the endless belt for tracking the endless belt between the first and second drums, with the bed comprising a plurality of rollers located intermediate and parallel to the first and second drums, with each of the rollers including a shaft defining an axis of rotation, with the shaft extending beyond axial ends of the roller, with the endless belt including opposite edges; first and second ledges extending between the first and second drums and extending over each shaft beyond the axial ends of the roller, with the ledges including friction reducing strips engaging with the engagement surface of the endless belt adjacent the opposite edges of the endless belt.

2. The conveyor of claim 1 with the bed including first and second frames, with each shaft including first and second ends and being axially slideable within the roller and biased from an installation position towards an operative position, with the first end of the shaft being axially spaced from the roller greater in the installation position than in the operative position, with the first end of the shaft slideably received in an aperture formed in the first frame and the second end of the shaft slideably received in an aperture formed in the second frame; with the conveyor further comprising, in combination: a blocking device removably secured to the first frame for abutting with the first end of the shaft received in the aperture of the first frame and in the operative position for preventing the shaft from sliding within the roller to the installation position.

3. Conveyor comprising, in combination: a first drum; a second drum parallel to and spaced from the first drum; a bed extending between the first and second drums; an endless belt passing around the first and second drums and over the bed, with the endless belt including an operative surface adapted to transport material and an engagement surface engaging with the first and second drums and the bed; a first continuous guide formed on the engagement surface of the endless belt; a first pulley on each of the first and second drums receiving the first continuous guide of the endless belt for tracking the endless belt between the first and second drums; a second continuous guide formed on the engagement surface of the endless belt in a spaced, parallel relation to the first continuous guide; a second pulley on each of the first and second drums receiving the second continuous guide of the endless belt for tracking the endless belt between the first and second drums; a spindle parallel to and spaced from the first and second drums, with the second drum including a first gear rotatable therewith, with an arm pivotally mounted to the second drum; a compound gear rotatably mounted to the arm about an axis parallel to and spaced from the second drum, with the compound gear in gearing relation with the first gear, with the compound gear being in driving relation with the spindle.

4. The conveyor of claim 3 with the spindle including a driven sprocket, with a chain extending around the compound gear and the driven sprocket to drivingly relate the compound gear and the driven sprocket and the spindle; with the conveyor further including an upright secured to the bed, with an elongated slot provided in the upright; a slide, with the slide including an idler sprocket having an axle extending through the elongated slot and secured to the slide; a bolt extending through the elongated slot and secured to the slide in a spaced, parallel relation to the axle, with the idler sprocket engaging with the chain, with the slide being biased relative to the upright to tension the chain.

5. The conveyor of claim 4 with a threaded rod being fixed relative to the upright and parallel and spaced from the elongated slot, with a spring sandwiched between the slide and a nut threadably received on the threaded rod.

6. The conveyor of claim 4 with the spindle including a drive shaft, with the driven sprocket mounted on the drive shaft; first and second collars held in a spaced relation by braces, with each of the collars mounting a bearing for receiving the drive shaft, with the driven sprocket located between the first and second collars, with the drive shaft having an axial end extending axially beyond the first collar and being cantilevered supported by the first and second collars, with the spindle including a driven shaft, with the driven shaft being removably axially coupled with the drive shaft.

7. Conveyor comprising, in combination: a first drum; a second drum parallel to and spaced from the first drum; a bed extending between the first and second drums; an endless belt passing around the first and second drums and over the bed, with the endless belt including an operative surface adapted to transport material and an engagement surface engaging with the first and second drums and the bed; a first continuous guide formed on the engagement surface of the endless belt; a first pulley on each of the first and second drums receiving the first continuous guide of the endless belt for tracking the endless belt between the first and second drums; a second continuous guide formed on the engagement surface of the endless belt in a spaced, parallel relation to the first continuous guide; and a second pulley on each of the first and second drums receiving the second continuous guide of the endless belt for tracking the endless belt between the first and second drums, with the first drum including a shaft having opposite axial ends, with each of the ends of the shaft received in a bearing mounted in a slide, with the slide being slideably mounted on a rail, with the rail including a lug, with a threaded rod secured to the lug and received in a bushing received in the slide, with a spring located around the threaded rod and sandwiched between the slide and a nut threadably received on the threaded rod to adjust the tension of the endless belt between the first and second drums.

8. Conveyor comprising, in combination: a first drum; a second drum parallel to and spaced from the first drum; a bed extending between the first and second drums; an endless belt passing around the first and second drums and over the bed, with the endless belt including an operative surface adapted to transport material and an engagement surface engaging with the first and second drums and the bed, with the bed comprising a plurality of rollers located intermediate and parallel to the first and second drums, with each of the rollers including a shaft defining an axis of rotation, with the shaft extending beyond axial ends of the roller, with the bed including first and second frames, with each shaft including first and second ends and being axially slideable within the roller and biased from an installation position towards an operative position, with the first end of the shaft being axially spaced from the roller greater in the installation position than in the operative position, with the first end of the shaft slideably received in an aperture formed in the first frame and the second end of the shaft slideably received in an aperture formed in the second frame; and a blocking device removably secured to the first frame for abutting with the first end of the shaft received in the aperture of the first frame and in the operative position for preventing the shaft from sliding within the roller to the installation position.

9. The conveyor of claim 8 with the first frame being tubular, with the blocking device being in the form of a rod slid into the first frame in a direction generally perpendicular to the shaft.

10. The conveyor of claim 9 with the bed further including a third frame, with the first frame being intermediate the second and third frames, with the plurality of rollers including first rollers located between the first and second frames and including second rollers located between the first and third frames, with the first ends of the first rollers and the first ends of the second rollers abutting on opposite sides of the rod.

11. The conveyor of claim 10 further comprising, in combination: first and second ledges extending between the first and second drums and extending over each shaft beyond the axial ends of the roller, with the endless belt including opposite edges, with the ledges including friction reducing strips engaging with the engagement surface of the endless belt adjacent the opposite edges of the endless belt.

12. The conveyor of claim 10 with each of the second and third frames including an inside wall, with the shafts of the rollers extending through apertures in the inside walls, with each of the second and third frames further including a top wall integrally formed with the inside wall and an outside wall integrally formed with the top wall, with the inside wall, the top wall and the outside wall being integrally formed by folding a sheet of material.

13. Conveyor comprising, in combination: a first drum; a second drum parallel to and spaced from the first drum; a bed extending between the first and second drums; an endless belt passing around the first and second drums and over the bed, with the endless belt including an operative surface adapted to transport material and an engagement surface engaging with the first and second drums and the bed; a spindle parallel to and spaced from the first and second drums, with the second drum including a first gear rotatable therewith, with an arm pivotally mounted to the second drum; and a compound gear rotatably mounted to the arm about an axis parallel to and spaced from the second drum, with the compound gear in gearing relation with the first gear, with the compound gear being in driving relation with the spindle.

14. The conveyor of claim 13 with the spindle including a driven sprocket, with a chain extending around the compound gear and the driven sprocket to drivingly relate the compound gear and the driven sprocket and the spindle; with the conveyor further including an upright secured to the bed, with an elongated slot provided in the upright; a slide, with the slide including an idler sprocket having an axle extending through the elongated slot and secured to the slide; a bolt extending through the elongated slot and secured to the slide in a spaced, parallel relation to the axle, with the idler sprocket engaging with the chain, with the slide being biased relative to the upright to tension the chain.

15. The conveyor of claim 14 with the spindle including a drive shaft, with the driven sprocket mounted on the drive shaft; first and second collars held in a spaced relation by braces, with each of the collars mounting a bearing for receiving the drive shaft, with the driven sprocket located between the first and second collars, with the drive shaft having an axial end extending axially beyond the first collar and being cantilevered supported by the first and second collars, with the spindle including a driven shaft, with the driven shaft being removably axially coupled with the drive shaft.

16. The conveyor of claim 8 further comprising, in combination: a first continuous guide formed on the engagement surface of the endless belt; a first pulley on each of the first and second drums receiving the first continuous guide of the endless belt for tracking the endless belt between the first and second drums; a second continuous guide formed on the engagement surface of the endless belt in a spaced, parallel relation to the first continuous guide; and a second pulley on each of the first and second drums receiving the second continuous guide of the endless belt for tracking the endless belt between the first and second drums.

17. The conveyor of claim 8 further comprising, in combination: a spindle parallel to and spaced from the first and second drums, with the second drum including a first gear rotatable therewith, with an arm pivotally mounted to the second drum; and a compound gear rotatably mounted to the arm about an axis parallel to and spaced from the second drum, with the compound gear in gearing relation with the first gear, with the compound gear being in driving relation with the spindle.

18. Conveyor comprising, in combination: a first drum; a second drum parallel to and spaced from the first drum; a bed extending between the first and second drums; an endless belt passing around the first and second drums and over the bed, with the endless belt including an operative surface adapted to transport material and an engagement surface engaging with the first and second drums and the bed, with the bed comprising a plurality of rollers located intermediate and parallel to the first and second drums, with each of the rollers including a shaft defining an axis of rotation, with the shaft extending beyond axial ends of the roller, with the bed including first and second frames, with each shaft including first and second ends and being axially slideable within the roller and biased from an installation position towards an operative position, with the first end of the shaft being axially spaced from the roller greater in the installation position than in the operative position, with the first end of the shaft slideably received man aperture formed in the first frame and the second end of the shaft slideably received in an aperture formed in the second frame; a blocking device removably secured to the first frame for abutting with the first end of the shaft received in the aperture of the first frame and in the operative position for preventing the shaft from sliding within the roller to the installation position; a first continuous guide formed on the engagement surface of the endless belt; a first pulley on each of the first and second drums receiving the first continuous guide of the endless belt for tracking the endless belt between the first and second drums; a spindle parallel to and spaced from the first and second drums, with the second drum including a first gear rotatable therewith, with an arm pivotally mounted to the second drum; and a compound gear rotatably mounted to the arm about an axis parallel to and spaced from the second drum, with the compound gear in gearing relation with the first gear, with the compound gear being in driving relation with the spindle.

19. The conveyor of claim 16 with the bed comprising a plurality of rollers located intermediate and parallel to the first and second drums, with each of the rollers including a shaft defining an axis of rotation, with the shaft extending beyond axial ends of the roller, with the endless belt including opposite edges; first and second ledges extending between the first and second drums and extending over each shaft beyond the axial ends of the roller, with the ledges including friction reducing strips engaging with the engagement surface of the endless belt adjacent the opposite edges of the endless belt.

* * * * *

UNITED STATES PATENT AND TRADEMARK OFFICE
CERTIFICATE OF CORRECTION

PATENT NO. : 7,347,320 B2
APPLICATION NO. : 10/833510
DATED : March 25, 2008
INVENTOR(S) : Thomas E. Isaman, David V. Cress and Steven M. Ferguson It is certified that error appears in the above-identified patent and that said Letters Patent is hereby corrected as shown below:

On Title page, item (56), insert:

| | | |
|---|---|---|
| -- 927,141 | 7/1909 | Hackney..........................239/679 |
| 2,500,682 | 3/1950 | Hoffstetter |
| 3,097,851 | 7/1963 | Cohrs et al......................239/679 |
| 3,113,784 | 12/1963 | Swenson et al. |
| 3,290,046 | 12/1966 | Bell et al.........................239/682X |
| 3,332,691 | 7/1967 | Swenson et al. |
| 3,344,993 | 10/1967 | Wilder et al. |
| 3,441,039 | 4/1969 | Rawson |
| 3,550,866 | 12/1970 | Swenson |
| 3,559,894 | 2/1971 | Murray et al. |
| 3,679,098 | 7/1972 | Weiss |
| 3,682,395 | 8/1972 | van der Lely et al. |
| 3,693,890 | 9/1972 | Torrey............................239/668 |
| 3,703,260 | 11/1972 | Grabske |
| 3,790,090 | 2/1974 | Lorenc et al. |
| 3,904,129 | 9/1975 | Lorenc |
| 4,023,689 | 5/1977 | Taylor et al. |
| 4,032,074 | 6/1977 | Amerine |
| 4,098,433 | 7/1978 | Oligschlaeger |
| 4,108,010 | 8/1978 | Taylor et al. |
| 4,124,167 | 11/1978 | Coleman........................239/673 |
| 4,212,428 | 7/1980 | Walker |
| 4,367,848 | 1/1983 | Ehmke et al....................239/676X |
| 4,438,873 | 3/1984 | Kaercher, Jr. |
| 4,473,184 | 9/1984 | Martin |
| 4,583,693 | 4/1986 | Harder |
| 4,591,102 | 5/1986 | Clarke............................239/682X |
| 4,685,619 | 8/1987 | Harder, deceased |
| 4,700,895 | 10/1987 | Takata |
| 4,804,145 | 2/1989 | Seymour |
| 4,842,202 | 6/1989 | van der Lely et al. |
| 5,046,664 | 9/1991 | van der Lely et al. |
| 5,096,125 | 3/1992 | Wise et al. |
| 5,170,947 | 12/1992 | Houle et al. |
| 5,170,948 | 12/1992 | Glick et al. |
| 5,186,396 | 2/1993 | Wise et al.--. |

UNITED STATES PATENT AND TRADEMARK OFFICE
CERTIFICATE OF CORRECTION

| | | |
|---|---|---|
| PATENT NO. | : 7,347,320 B2 | |
| APPLICATION NO. | : 10/833510 | |
| DATED | : March 25, 2008 | |
| INVENTOR(S) | : Thomas E. Isaman, David V. Cress and Steven M. Ferguson | |

It is certified that error appears in the above-identified patent and that said Letters Patent is hereby corrected as shown below:

Column 10, line 51, cancel "man" and substitute therefore --in an--.

Signed and Sealed this

Fifteenth Day of September, 2009

David J. Kappos
*Director of the United States Patent and Trademark Office*